United States Patent
Sobol et al.

(10) Patent No.: US 12,544,261 B2
(45) Date of Patent: Feb. 10, 2026

(54) OPERATING A VITRECTOR IN A PARTIALLY-CLOSED PNEUMATIC LOOP

(71) Applicant: JOHNSON & JOHNSON SURGICAL VISION, INC., Irvine, CA (US)

(72) Inventors: Sergey Sobol, Haifa (IL); Ilya Sitnitsky, Nahariya (IL); Elad Avraham Diukman, Haifa (IL); Alexander Shechtman, Haifa (IL); Assaf Govari, Haifa (IL)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 512 days.

(21) Appl. No.: 18/138,392

(22) Filed: Apr. 24, 2023

(65) Prior Publication Data
US 2024/0350313 A1    Oct. 24, 2024

(51) Int. Cl.
A61F 9/007     (2006.01)
A61M 39/24    (2006.01)
A61B 17/00    (2006.01)

(52) U.S. Cl.
CPC ......... *A61F 9/00763* (2013.01); *A61M 39/24* (2013.01); *A61B 2017/00544* (2013.01)

(58) Field of Classification Search
CPC .............. A61F 9/00763; A61M 39/24; A61B 2017/00544; F16K 15/00
See application file for complete search history.

(56) References Cited

U.S. PATENT DOCUMENTS

| | | | |
|---|---|---|---|
| 5,352,230 A * | 10/1994 | Hood | B25D 9/08 606/86 R |
| 7,335,217 B2 | 2/2008 | Wang et al. | |
| 2003/0195538 A1 | 10/2003 | Wang et al. | |
| 2007/0260183 A1 | 11/2007 | Shores et al. | |
| 2012/0157906 A1 | 6/2012 | Underwood et al. | |
| 2014/0171995 A1 | 6/2014 | Mcdonell | |
| 2016/0270957 A1* | 9/2016 | Easley | A61F 9/00736 |

FOREIGN PATENT DOCUMENTS

| | | |
|---|---|---|
| KR | 1948842 B1 | 2/2019 |
| WO | 2015092472 A1 | 6/2015 |

OTHER PUBLICATIONS

Compressed air recirculation, Power and Motion, Jul. 15, 2008, https://www.powermotiontech.com/pneumatics/vacuum-technology/article/21880698/compressed air-recirculation.

* cited by examiner

*Primary Examiner* — P. Macade Nichols

(57) ABSTRACT

An apparatus includes a compressor, which is configured to compress air and includes an input port and an output port, an output conduit coupled with the output port and configured to receive the air from the compressor, an input conduit coupled with the input port, a switching valve coupled with the output conduit and with the input conduit, and configured to couple a pneumatic surgical cutting tool, alternatingly, with the output conduit and with the input conduit, and a supply conduit coupled with the input conduit and configured to supply the air, to the input conduit, from a surrounding environment. The supply conduit includes a one-way valve configured to inhibit the air from escaping from the input conduit to the surrounding environment when the compressor is idle. Other examples are also described.

16 Claims, 2 Drawing Sheets

OPERATING A VITRECTOR IN A PARTIALLY-CLOSED PNEUMATIC LOOP

FIELD OF THE INVENTION

The present disclosure is related generally to the field of pneumatics, and particularly to pneumatically-operated surgical instruments.

BACKGROUND OF THE INVENTION

A pneumatic cutting tool, such as a pneumatic vitrector, is driven by pulsating streams of compressed air.

BRIEF DESCRIPTION OF THE DRAWINGS

The present disclosure will be more fully understood from the following detailed description of examples thereof, taken together with the drawings, in which.

DETAILED DESCRIPTION

Overview

In a pneumatic system for operating a surgical tool, a compressor draws air through a lower-pressure input line and compresses the air into a higher-pressure output line. The input line and output line are both connected to a switching valve, which in turn is connected to the tool. The switching valve is configured to oscillate between the input line and the output line, thereby supplying the tool with pulsating streams of compressed air from the output line. The input line is also connected to a supply line, which is open to the surrounding environment and supplies the input line with ambient air.

A problem, with such a system, is that while the compressor is idle, the compressed air in the output line may flow, through the compressor or through the switching valve, into the input line, and escape from the input line, via the supply line, into the surrounding environment. As result, the system may be contaminated by humidity or dust from the surrounding air. Moreover, additional time and energy may be required to repressurize the output line. This problem may be particularly acute in the event that—as is often the case—the surgeon pauses the operation of the tool multiple times during the procedure.

To solve this problem, examples of the present disclosure provide the supply line with a one-way valve, which inhibits the escape of air from the input line to the surrounding environment.

Typically, examples of the present disclosure further provide the output line with another one-way valve, which inhibits the backward flow of air through the compressor while the compressor is idle. Advantageously, this helps prevent damage to the compressor.

System Description

Figure 1:
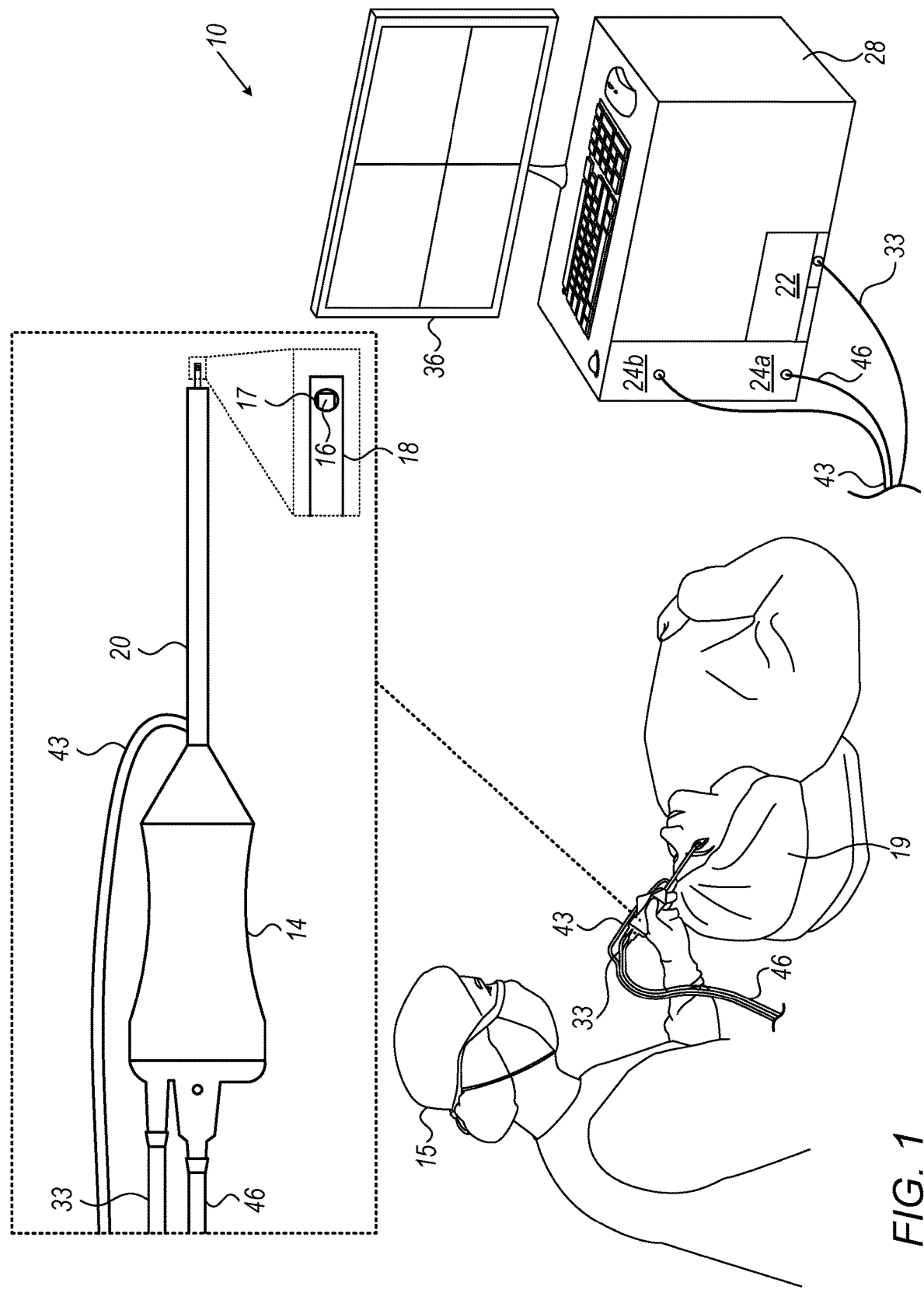
FIG. 1 is a schematic illustration of a surgical system, in accordance with some examples of the present disclosure.

Reference is now made to FIG. 1, which is a schematic illustration of a surgical system 10, in accordance with some examples of the present disclosure.

System 10 comprises a pneumatic surgical cutting tool 14, which a physician 15 may use to perform a surgical procedure on a patient 19.

In some examples, tool 14 comprises a pneumatic vitrector. In some such examples, the vitrector comprises a blade 16 disposed within a needle 18, which protrudes from a sleeve 20. As suction is applied through needle 18 via an aspiration tube 46, vitreous humor of patient 19 is sucked into needle 18 through a hole 17 in the needle. While the vitreous humor is within the needle, streams of compressed air, applied via a pneumatic tube 33, cause blade 16 to reciprocate within the needle, thereby cutting the vitreous humor. The resulting debris is aspirated through aspiration tube 46. At the same time, an irrigation fluid, such as a balanced salt solution, is delivered through sleeve 20, via an irrigation tube 43, so as to maintain the intraocular pressure within the eye of patient 19.

System 10 further comprises a pneumatic supply 22 configured to deliver the compressed air through pneumatic tube 33. System further comprises a pump 24a configured to apply the suction through aspiration tube 46. Typically, pneumatic supply 22 and pump 24a are contained within a console 28.

In some examples, system 10 further comprises another pump 24b configured to pump the irrigation fluid (e.g., from a bottle or bag) through irrigation tube 43. (Pump 24b may be contained within console 28.) Alternatively, pump 24b may be omitted, and the irrigation fluid may be delivered through irrigation tube 43 by the force of gravity.

System 10 may further comprise a display 36, which may display images of the patient's anatomy and/or any other suitable output.

Figure 2:
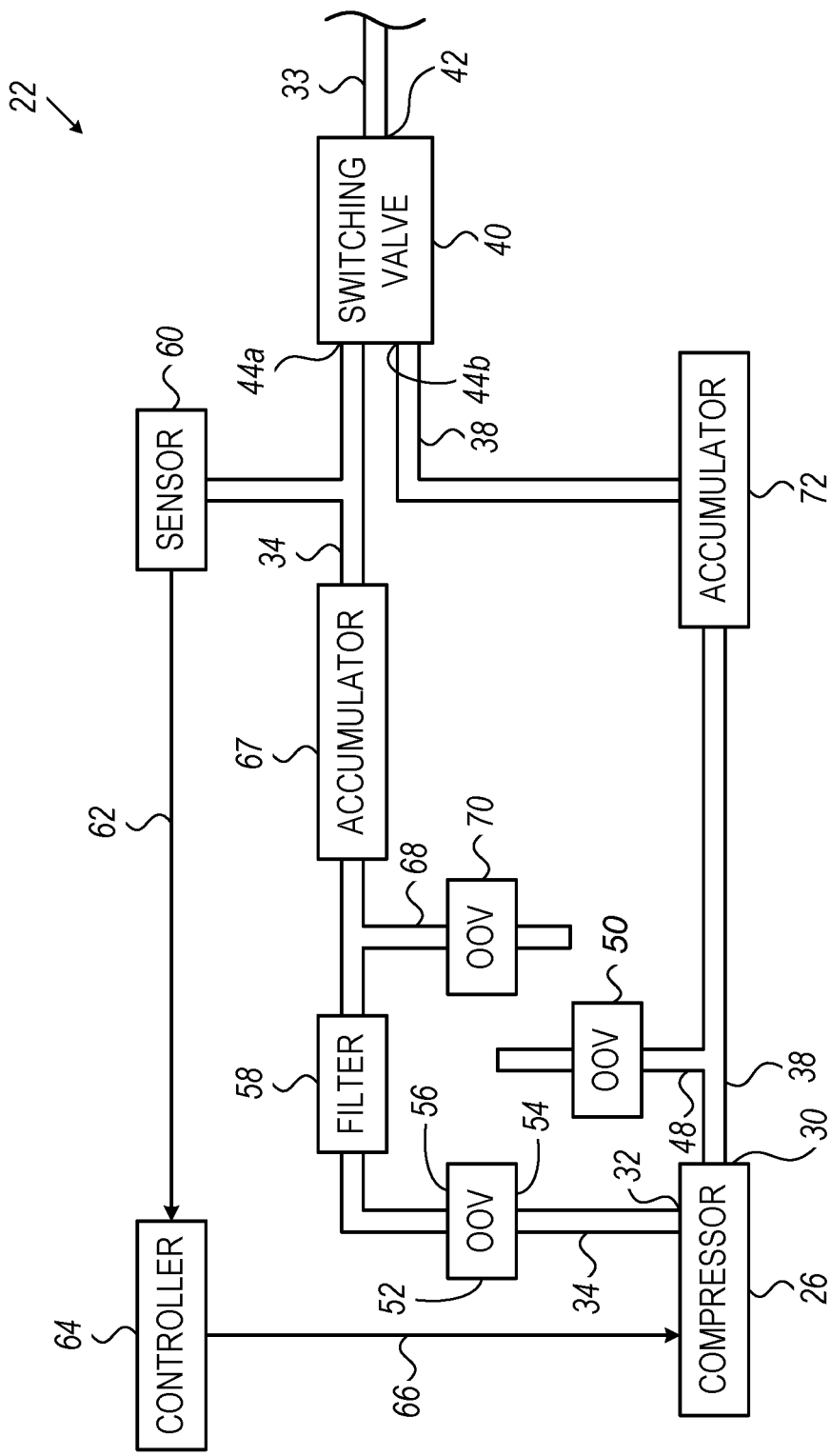
FIG. 2 is a schematic illustration of a pneumatic supply, in accordance with some examples of the present disclosure.

Reference is now made to FIG. 2, which is a schematic illustration of pneumatic supply 22, in accordance with some examples of the present disclosure.

Pneumatic supply 22 comprises a compressor 26, which is configured to compress air. Compressor 26 comprises an input port 30 and an output port 32. An output conduit 34 is coupled with output port 32 and is configured to receive the air from the compressor. An input conduit 38 is coupled with input port 30. A switching valve 40 is coupled with output conduit 34 and with input conduit 38, and is configured to couple tool 14 (FIG. 1), alternatingly, with output conduit 34 and with input conduit 38. In other words, switching valve 40 oscillates between a first setting, in which tool 14 is coupled with output conduit 34, and a second setting, in which tool 14 is coupled with input conduit 38.

For example, switching valve 40 may comprise an output port 42 coupled with pneumatic tube 33, which, as described above with reference to FIG. 1, is coupled with tool 14. The switching valve may further comprise two input ports 44a and 44b, which are coupled with output conduit 34 and input conduit 38, respectively. In the first setting, the switching valve may establish fluidic communication between output conduit 34 and pneumatic tube 33. In the second setting, switching valve 40 may establish fluidic communication between input conduit 38 and pneumatic tube 33.

Pneumatic supply 22 further comprises a supply conduit 48 coupled with input conduit 38 and configured to supply the air, to input conduit 38, from the surrounding environment. By virtue of this supply, the pressure in input conduit 38 is, typically, approximately equal to the atmospheric pressure of the surrounding environment (typically, around 14.7 PSI).

Thus, for example, while tool 14 is coupled with output conduit 34, the higher air pressure in output conduit 34 may drive blade 16 (FIG. 1) forward. In contrast, while tool 14 is coupled with input conduit 38, the lower air pressure in input conduit 38 may permit a spring (not shown) to drive the blade back.

Advantageously, supply conduit 48 comprises a one-way valve (OOV) 50 configured to inhibit the air from escaping from input conduit 38 to the surrounding environment when compressor 26 is idle. For example, OOV 50 may be configured to be open whenever the atmospheric pressure of the surrounding environment exceeds the pressure of the air within input conduit 38 by at least a predetermined threshold pressure difference, and closed otherwise. OOV 50 may be selected or manufactured such that the threshold pressure difference is as small as possible, e.g., less than 2 PSI, and the pressure within input conduit 38 thus remains approximately equal to the atmospheric pressure.

Typically, output conduit 34 comprises another OOV 52 configured to inhibit the air from flowing from output conduit 34 to input conduit 38, via compressor 26, when the compressor is idle. For example, OOV 52 may be configured to be open whenever the air pressure at the upstream end 54 of OOV 52, which faces output port 32, exceeds the air pressure at the downstream end 56 of OOV 52, which faces away from output port 32, by at least a predetermined threshold pressure difference, and closed otherwise. OOV 52 may be selected or manufactured such that the threshold pressure difference is as small as possible, e.g., less than 2 PSI, so as to reduce the load on compressor 26.

Typically, supply 22 further comprises a pressure sensor 60 and a controller 64. Sensor 60 is configured to sense the pressure in output conduit 34 and to output a signal 62, which is indicative of the pressure, to controller 64. In response to the pressure, controller 64 outputs a control signal 66 to compressor 26, thereby controlling compressor 26.

In some examples, output conduit 34 further comprises a filter 58 configured to filter the air in output conduit 34. Alternatively or additionally, output conduit 34 may comprise an accumulator 67 configured to maintain an approximately constant pressure at input port 44a of switching valve 40.

Alternatively or additionally, supply 22 may comprise a safety conduit 68, which comprises another OOV 70, coupled with the output conduit. OOV 70 may be configured to be open when the pressure within output conduit 34 exceeds the atmospheric pressure by a relatively large threshold (e.g., 30 PSI), and closed otherwise.

Alternatively or additionally, input conduit 38 may comprise another accumulator 72 configured to maintain an approximately constant pressure at input port 30 of compressor 26.

Although the present description pertains to surgical tools, it is noted that examples of the present disclosure are applicable to any type of pneumatically-driven instrument.

EXAMPLES

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus (22) includes a compressor (26), which is configured to compress air and includes an input port (30) and an output port (32), an output conduit (34) coupled with the output port and configured to receive the air from the compressor, an input conduit (38) coupled with the input port (30), a switching valve (40) coupled with the output port and with the input conduit, and configured to couple a pneumatic surgical cutting tool (14), alternatingly, with the output conduit and with the input conduit, and a supply conduit (48) coupled with the input conduit and configured to supply the air, to the input conduit, from a surrounding environment. The supply conduit includes a one-way valve (50) configured to inhibit the air from escaping from the input conduit to the surrounding environment when the compressor is idle.

Example 2

The apparatus (22) according to Example 1, wherein the one-way valve (50) is configured to be open whenever an atmospheric pressure of the surrounding environment exceeds a pressure of the air within the input conduit (38) by at least a predetermined threshold pressure difference.

Example 3

The apparatus (22) according to Example 2, wherein the threshold pressure difference is less than 2 PSI.

Example 4

The apparatus (22) according to any one of Examples 1-3, wherein the one-way valve (50) is a first one-way valve, and wherein the output conduit (34) comprises a second one-way valve (52) configured to inhibit the air from flowing from the output conduit to the input conduit (38), via the compressor (26), when the compressor is idle.

Example 5

The apparatus (22) according to Example 4, wherein an upstream end (54) of the second one-way valve (52) faces the output port (32) and a downstream end (56) of the second one-way valve faces away from the output port, and wherein the second one-way valve is configured to be open whenever an upstream pressure of the air at the upstream end exceeds a downstream pressure of the air at the downstream end by at least a predetermined threshold pressure difference.

Example 6

The apparatus (22) according to Example 5, wherein the threshold pressure difference is less than 2 PSI.

Example 7

The apparatus (22) according to any one of Examples 1-6, further comprising the pneumatic surgical cutting tool (14).

Example 8

The apparatus (22) according to Example 7, wherein the pneumatic surgical cutting tool (14) comprises a vitrector.

Example 9

A method includes coupling an output port (32) of a compressor (26), which is configured to compress air, with an output conduit (34) configured to receive the air from the compressor, coupling an input port (30) of the compressor with an input conduit (38), coupling the output conduit and the input conduit with a switching valve (40) configured to couple a pneumatic surgical cutting tool (14), alternatingly, with the output conduit and with the input conduit, and coupling the input conduit with a supply conduit (48) configured to supply the air, to the input conduit, from a surrounding environment. The supply conduit includes a one-way valve (50) configured to inhibit the air from escaping from the input conduit to the surrounding environment when the compressor is idle.

Example 10

The method according to Example 9, wherein the one-way valve (50) is configured to be open whenever an atmospheric pressure of the surrounding environment exceeds a pressure of the air within the input conduit (38) by at least a predetermined threshold pressure difference.

Example 11

The method according to Example 10, wherein the threshold pressure difference is less than 2 PSI.

Example 12

The method according to any one of Examples 9-11, wherein the one-way valve (50) is a first one-way valve, and wherein the output conduit (34) includes a second one-way valve (52) configured to inhibit the air from flowing from the output conduit to the input conduit (38), via the compressor (26), when the compressor is idle.

Example 13

The method according to claim 12, wherein an upstream end (54) of the second one-way valve (52) faces the output port (32) and a downstream end (56) of the second one-way valve faces away from the output port, and wherein the second one-way valve is configured to be open whenever an upstream pressure of the air at the upstream end exceeds a downstream pressure of the air at the downstream end by at least a predetermined threshold pressure difference.

Example 14

The method according to Example 13, wherein the threshold pressure difference is less than 2 PSI.

Example 15

The method according to any one of Examples 9-14, further comprising coupling the pneumatic surgical cutting tool (14) with the switching valve (40).

Example 16

The method according to Example 15, wherein the pneumatic surgical cutting tool (14) includes a vitrector.

It will be appreciated by persons skilled in the art that the present disclosure is not limited to what has been particularly shown and described hereinabove. Rather, the scope of the present disclosure includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the Applications except that to the extent any terms are defined in these incorporated documents in a manner that conflicts with the definitions made explicitly or implicitly in the present specification, only the definitions in the present specification should be considered.

The invention claimed is:

1. Apparatus, comprising:
    a compressor, configured to compress air and comprising an input port and an output port;
    an output conduit coupled with the output port and configured to receive the air from the compressor;
    an input conduit coupled with the input port;
    a switching valve coupled with the output conduit and with the input conduit, and configured to couple a pneumatic surgical cutting tool, alternatingly, with the output conduit and with the input conduit; and
    a supply conduit coupled with the input conduit and configured to supply the air, to the input conduit, from a surrounding environment, the supply conduit comprising a one-way valve configured to inhibit the air from escaping from the input conduit to the surrounding environment when the compressor is idle.

2. The apparatus according to claim 1, wherein the one-way valve is configured to be open whenever an atmospheric pressure of the surrounding environment exceeds a pressure of the air within the input conduit by at least a predetermined threshold pressure difference.

3. The apparatus according to claim 2, wherein the threshold pressure difference is less than 2 PSI.

4. The apparatus according to claim 1, wherein the one-way valve is a first one-way valve, and wherein the output conduit comprises a second one-way valve configured to inhibit the air from flowing from the output conduit to the input conduit, via the compressor, when the compressor is idle.

5. The apparatus according to claim 4, wherein an upstream end of the second one-way valve faces the output port and a downstream end of the second one-way valve faces away from the output port, and wherein the second one-way valve is configured to be open whenever an upstream pressure of the air at the upstream end exceeds a downstream pressure of the air at the downstream end by at least a predetermined threshold pressure difference.

6. The apparatus according to claim 5, wherein the threshold pressure difference is less than 2 PSI.

7. The apparatus according to claim 1, further comprising the pneumatic surgical cutting tool.

8. The apparatus according to claim 7, wherein the pneumatic surgical cutting tool comprises a vitrector.

9. A method, comprising:
coupling an output port of a compressor, which is configured to compress air, with an output conduit configured to receive the air from the compressor;
coupling an input port of the compressor with an input conduit;
coupling the output conduit and the input conduit with a switching valve configured to couple a pneumatic surgical cutting tool, alternatingly, with the output conduit and with the input conduit; and
coupling the input conduit with a supply conduit configured to supply the air, to the input conduit, from a surrounding environment, the supply conduit including a one-way valve configured to inhibit the air from escaping from the input conduit to the surrounding environment when the compressor is idle.

10. The method according to claim 9, wherein the one-way valve is configured to be open whenever an atmospheric pressure of the surrounding environment exceeds a pressure of the air within the input conduit by at least a predetermined threshold pressure difference.

11. The method according to claim 10, wherein the threshold pressure difference is less than 2 PSI.

12. The method according to claim 9, wherein the one-way valve is a first one-way valve, and wherein the output conduit includes a second one-way valve configured to inhibit the air from flowing from the output conduit to the input conduit, via the compressor, when the compressor is idle.

13. The method according to claim 12, wherein an upstream end of the second one-way valve faces the output port and a downstream end of the second one-way valve faces away from the output port, and wherein the second one-way valve is configured to be open whenever an upstream pressure of the air at the upstream end exceeds a downstream pressure of the air at the downstream end by at least a predetermined threshold pressure difference.

14. The method according to claim 13, wherein the threshold pressure difference is less than 2 PSI.

15. The method according to claim 9, further comprising coupling the pneumatic surgical cutting tool with the switching valve.

16. The method according to claim 15, wherein the pneumatic surgical cutting tool includes a vitrector.

* * * * *